(12) United States Patent
    Kakadia et al.

(10) Patent No.: US 9,219,658 B2
(45) Date of Patent: Dec. 22, 2015

(54) QUALITY OF SERVICE OPTIMIZATION MANAGEMENT TOOL

(71) Applicant: Verizon Patent and Licensing Inc., Basking Ridge, NJ (US)

(72) Inventors: Deepak Kakadia, Antioch, CA (US); Hai Shao, Fremont, CA (US); Michael D. Rinehart, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 33 days.

(21) Appl. No.: 14/251,891

(22) Filed: Apr. 14, 2014

(65) Prior Publication Data

US 2015/0295787 A1    Oct. 15, 2015

(51) Int. Cl.
    *H04L 12/24* (2006.01)
    *H04L 12/26* (2006.01)
    *H04L 12/851* (2013.01)

(52) U.S. Cl.
    CPC ............ *H04L 41/5035* (2013.01); *H04L 41/22* (2013.01); *H04L 43/062* (2013.01); *H04L 43/065* (2013.01); *H04L 47/2483* (2013.01)

(58) Field of Classification Search
    CPC ... H04L 41/5035; H04L 41/22; H04L 43/062; H04L 43/065
    See application file for complete search history.

(56) References Cited

U.S. PATENT DOCUMENTS

| | | | | |
|---|---|---|---|---|
| 6,502,131 | B1* | 12/2002 | Vaid | H04L 1/1854 709/224 |
| 6,738,353 | B2* | 5/2004 | Chong | H04L 12/2602 370/241 |
| 8,605,586 | B2* | 12/2013 | Park | H04W 36/22 370/230 |
| 2003/0107590 | A1* | 6/2003 | Levillain | H04L 29/06027 715/736 |
| 2007/0002868 | A1* | 1/2007 | Qian | H04W 28/24 370/395.21 |
| 2015/0074258 | A1* | 3/2015 | Ferreira | H04L 43/0876 709/224 |

OTHER PUBLICATIONS

Bird et al., "PACORA: Performance Aware Convex Optimization for Resource Allocation", https://www.usenix.org/legacy/events/hotpar11/tech/final_files/Bird.pdf, 2011, 6 pages.

* cited by examiner

*Primary Examiner* — Chi H Pham
*Assistant Examiner* — Weibin Huang

(57) ABSTRACT

A device may receive traffic information associated with traffic flows assigned to a group of quality of service (QoS) treatment levels and travelling via a network device. The device may identify a group of target performance metrics corresponding to the group of QoS treatment levels. The device may determine a group of weight factors based on the traffic information and the group of target performance metrics. The group of weight factors may be determined such that a group of predicted performance metrics is optimized with respect to the group of target performance metrics. The device may output information identifying the group of weight factors to cause a parameter, associated with the network device, to be updated based on the group of weight factors. The parameter may relate to a manner in which the traffic flows are processed by the network device.

20 Claims, 11 Drawing Sheets

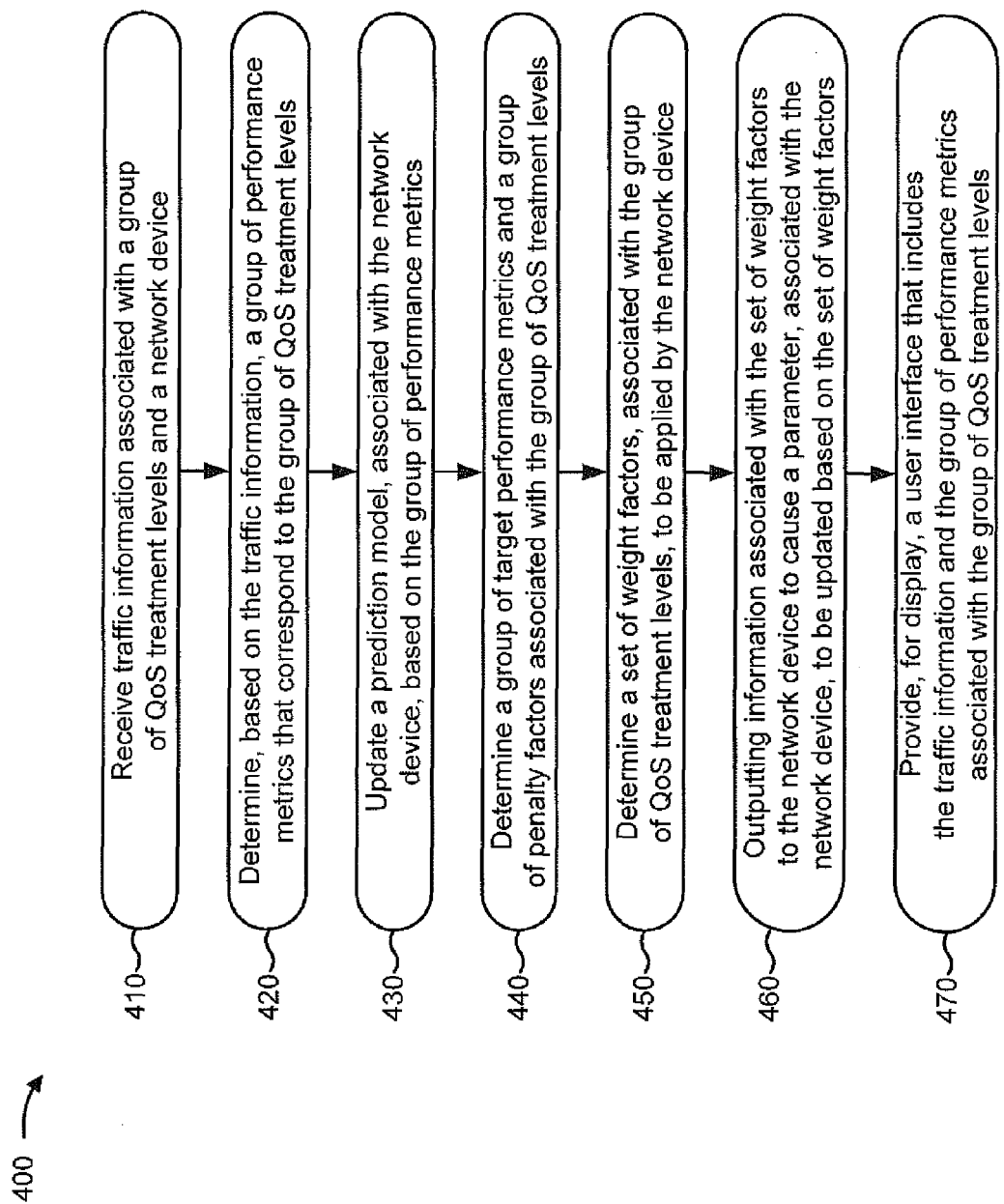

QUALITY OF SERVICE OPTIMIZATION MANAGEMENT TOOL

BACKGROUND

The goal of quality of service (QoS) is to assure treatment for traffic travelling via a network such that one or more performance metrics (e.g., an amount of latency, an error rate, an amount of bandwidth, an amount of throughput, an amount of jitter, etc.) is as close as possible to satisfying a target performance metric. In some cases, the QoS treatment level associated with the traffic may be determined based on a QoS class identifier (QCI) (e.g., QCI1 through QCI9).

BRIEF DESCRIPTION OF THE DRAWINGS

FIG. 4 is a flow chart of an example process for updating a parameter, associated with a network device and based on a set of weight factors, to optimize a group of performance metrics for traffic travelling via the network device.

DETAILED DESCRIPTION OF THE PREFERRED EMBODIMENTS

The following detailed description of example implementations refers to the accompanying drawings. The same reference numbers in different drawings may identify the same or similar elements.

Traffic, associated with one or more applications, that travels via a network (e.g., via multiple network devices) may be assigned to different quality of service (QoS) treatment levels. For example, a first application (e.g., a voice call application) may be assigned to a first QoS treatment level indicating that traffic, associated with the first application, is to travel via the network with an amount of latency that satisfies a first target amount of latency (e.g., such that the amount of latency is less than or equal to the first target). Similarly, a second application (e.g., a web browsing application) may be assigned to a second QoS treatment level such that traffic, associated with the second application, is to travel via the network with an amount of latency that satisfies a second target amount of latency that is greater than the first target amount of latency (e.g., such that the amount of latency is less than or equal to the second target).

However, there is no tool that allows a network service provider to determine (e.g., in real-time) whether network devices included in the network are satisfying (e.g., from end-to-end, on a per segment basis, etc.) a target performance metric associated with a QoS treatment level. Rather, the network devices included in the network may manage the traffic based on relative priorities, and the network service provider may be unable to determine whether the target performance metric is being satisfied (e.g., on a global basis, on a per segment basis, etc.). Implementations described herein may allow network devices included in a network to be configured such that traffic travelling via the network is processed in an optimized manner based on a target performance metric associated with a QoS treatment level assigned to the traffic.

Implementations described herein may also allow a network service provider, associated with a network, to be provided with a user interface associated with the performance of the network devices with respect to target performance metrics, such that the user may view, control, manage, configure, etc. the optimization of the network devices.

Figure 1A:
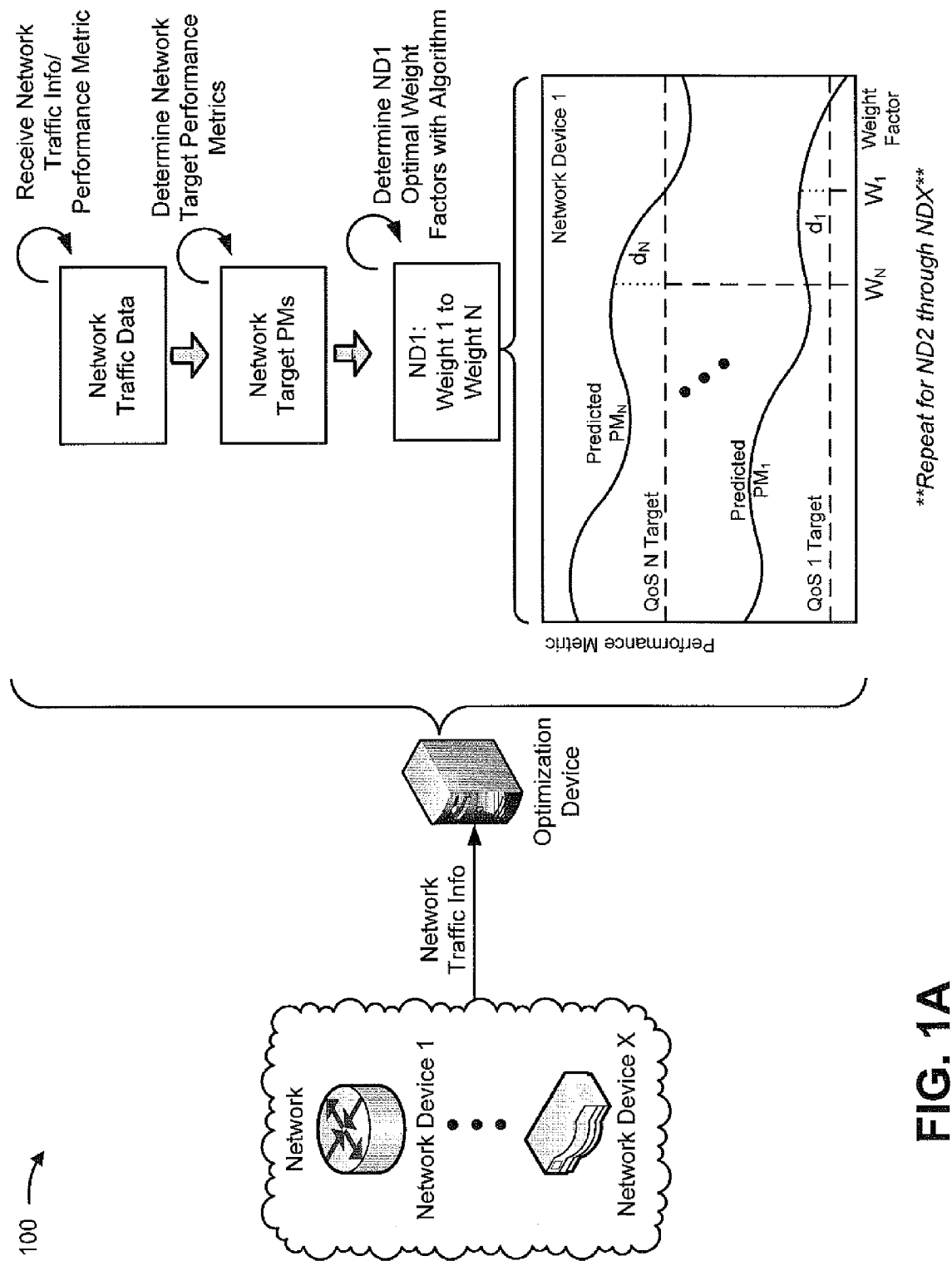
FIGS. 1A-1C are diagrams of an overview of an example implementation described herein.
Figure 1B:
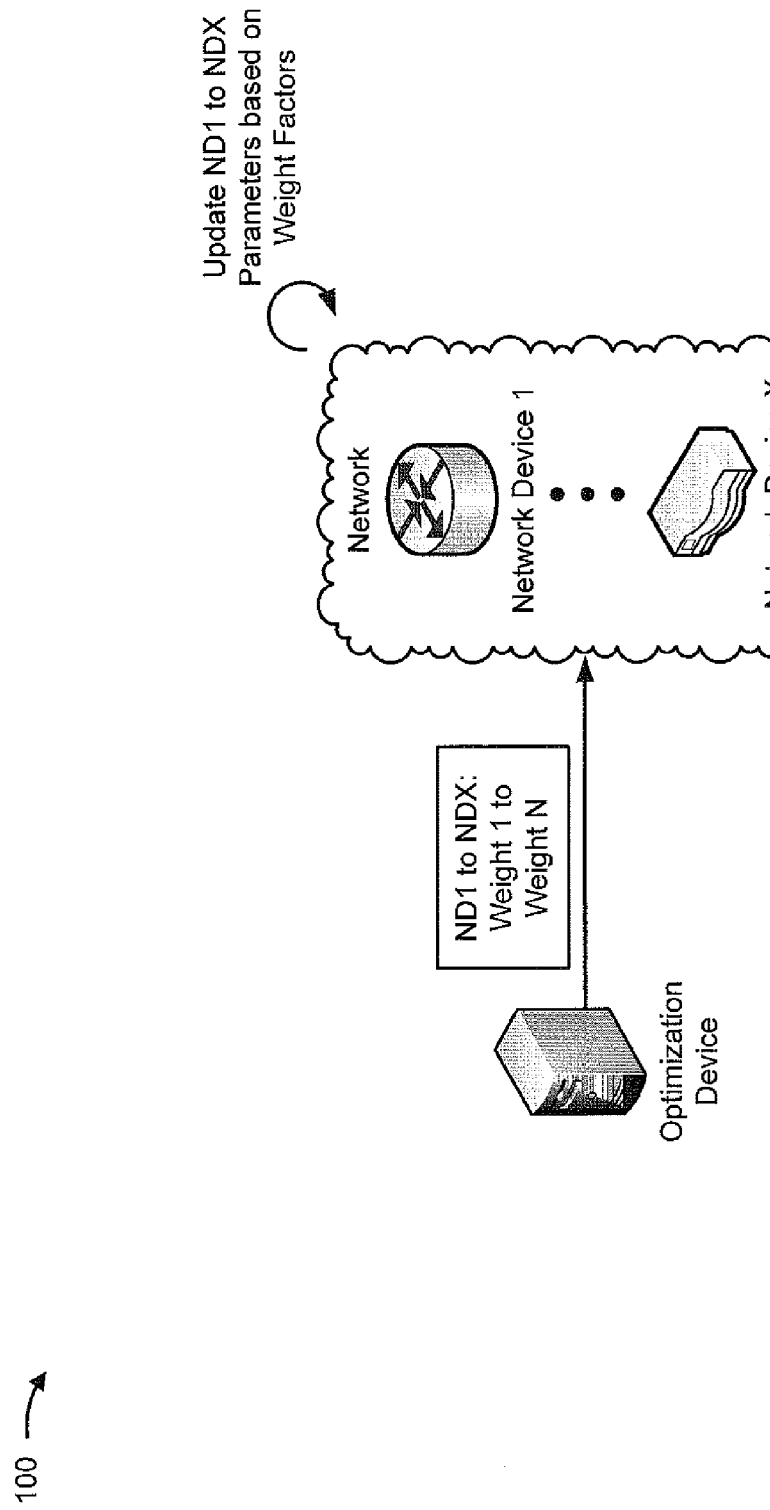
Figure 1C:
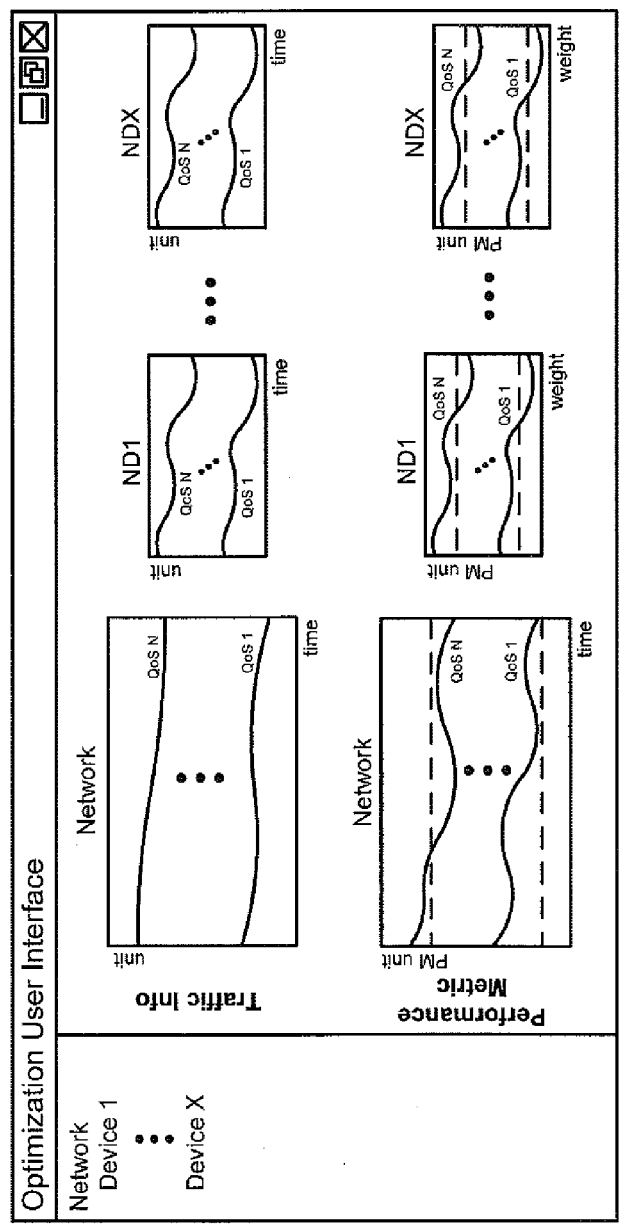

FIGS. 1A-1C are diagrams of an overview of an example implementation 100 described herein. For the purposes of example implementation 100, assume that a network includes a group of network devices (e.g., network device 1 through network device X). Further, assume that traffic flows travelling via the network (e.g., via the group of network devices) may be assigned to one of a group of QoS treatment levels (e.g., QoS 1 to QoS N), and that each QoS treatment level identifies a corresponding target performance metric. Finally, assume that an optimization device is configured to optimize each network device such that the traffic flows are treated in accordance with the target performance metrics identified by the QoS treatment levels.

As shown in FIG. 1A, the group of network devices may provide traffic information to the optimization device. The traffic information may include information associated with the performance metric (e.g., a traffic arrival rate, packet arrival time stamp information, etc.) for traffic assigned to each QoS treatment level. As further shown, the optimization device may determine (e.g., based on information stored by the optimization device, etc.) a target performance metric for each QoS treatment level of traffic travelling via the network.

As further shown, the optimization device may determine a first set of weight factors to be applied to traffic at network device 1 (ND1) in order to optimize the performance of network device 1. The optimization device may determine the first set of weight factors using a weight factor algorithm designed to determine a set of distances (e.g., where each distance corresponds to a difference between a target performance metric and a predicted performance metric associated with a QoS treatment level) such that the sum of the distances is minimized. As shown, the optimization device may repeat this process for network device 2 (ND2) via network device X (NDX).

For the purposes of FIG. 1B, assume that the optimization device has determined a set of weight factors for each network device included in the network (e.g., in a manner similar to that described above with regard to network device 1). As shown, the optimization device may provide the sets of weight factors to the group of network devices, and each network device may update a parameter, associated with processing traffic assigned to each QoS treatment level, based on a set of weight factors corresponding to the network device. The optimization device may receive additional traffic information, and may repeat the steps described above (e.g., such that the optimization device continuously updates the parameters of the network devices to optimize the performance of the network).

For the purposes of FIG. 1C, assume that the optimization device is configured to provide, for display, a user interface associated with optimizing the network (e.g., based on the process described above). As shown, the optimization device may provide a user interface that includes a first display (e.g., a plot of traffic information with respect to time) associated with the traffic information received by the optimization device. As shown, the first display may be associated with the network (e.g., including ND1 to NDX) as a whole, and may include information associated with each QoS treatment level. Similarly, the user interface may include additional displays showing traffic information corresponding to each network device included in the network.

As further shown, the user interface may include a second display (e.g., a plot of performance metric data with respect to time) associated with the performance metric and the network. As shown, the second display may include information associated with the performance metric (e.g., for the network as a whole) for each QoS treatment level, and may include information associated with a target performance metric for each QoS treatment level. Similarly, the user interface may include additional displays showing the performance metric corresponding to each network device included in the network. The optimization device may update the user interface (e.g., in real-time, every 1 second, etc.) each time the optimization device receives traffic information and updates the parameters associated with the network devices (e.g., each time the optimization device optimizes the network). In some cases, the user interface may also include one or more elements (e.g., buttons, menus, etc.) that allow the user to view, control, manage, predict, and/or configure a manner in which the network and/or one or more network devices are optimized.

In this way, one or more network devices, included in a network, may be optimized based on target performance metrics (e.g., associated with one or more QoS treatment levels) for traffic travelling via the network. Furthermore, a network service provider may be provided with a user interface that allows the network service provider to determine (e.g., in real-time) whether the network devices are satisfying the target performance metrics and/or view, control, configure, manage, etc. the optimization of the network devices.

Figure 2:
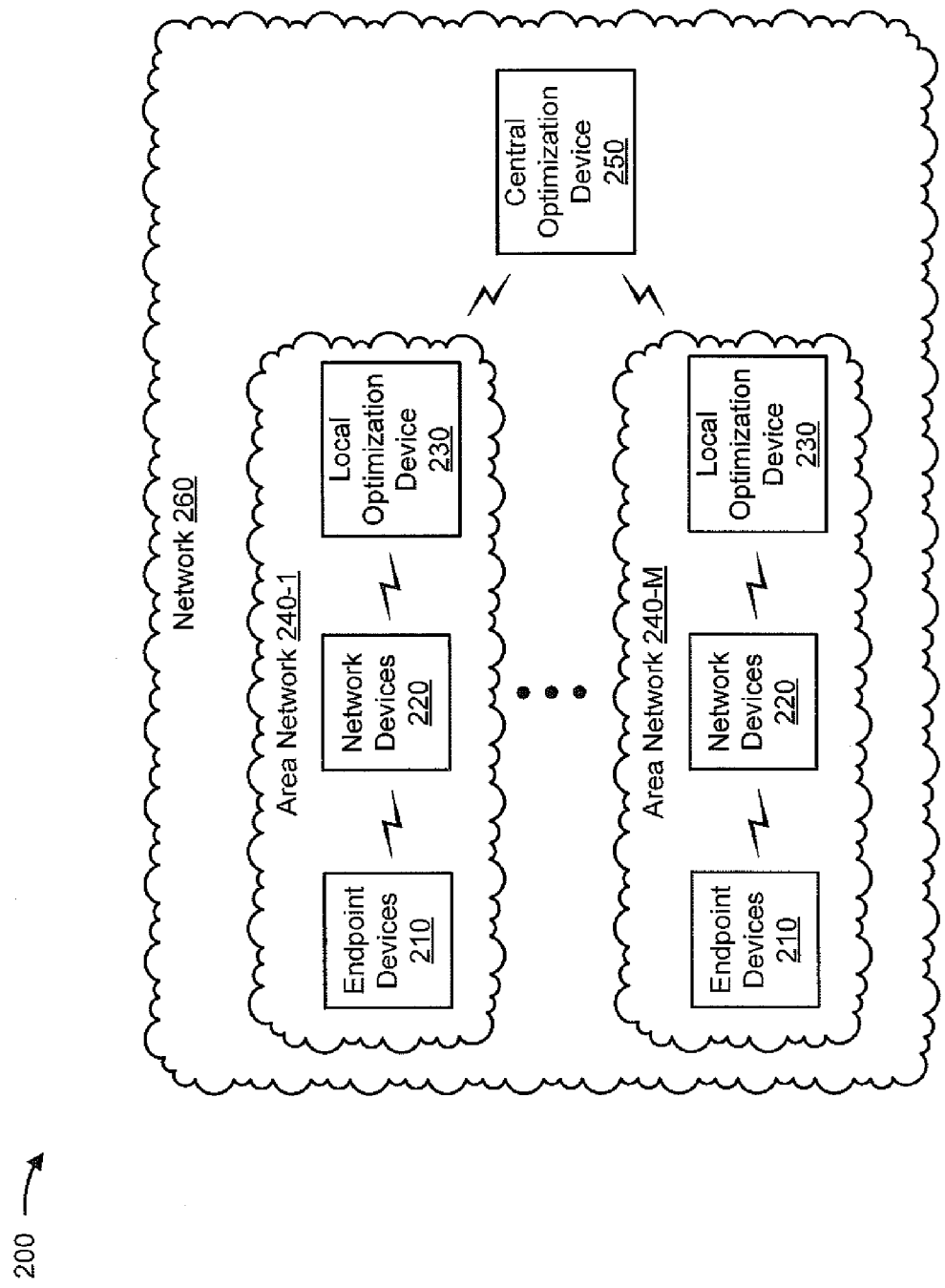
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include endpoint devices 210, network devices 220, local optimization devices 230, a set of area networks 240-1 through 240-M (M>1) (hereinafter collectively referred to as "area networks 240," and individually as "area network 240"), central optimization device 250, and network 260.

Endpoint device 210 may include a device capable of communicating with another device (e.g., another endpoint device 210, etc.) via one or more network devices 220, area network 240, and/or network 260. For example, endpoint device 210 may include a server, radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a desktop computer, a laptop computer, a tablet computer, and/or another type of wired or wireless device. In some implementations, a network service provider (e.g., associated with area network 240 and/or network 260) may wish to optimize performance of network devices 220 included in area network 240 and/or network 260 such that traffic, associated with endpoint device 210, is treated in accordance with a QoS treatment level to which the traffic is assigned.

Network device 220 may include one or more devices, included in area network 240 and/or network 260, that may be configured based on information provided by local optimization device 230 and/or central optimization device 250. For example, network device 220 may include a base station (e.g., an evolved node B (eNodeB)), a gateway, a router, a modem, a switch, a firewall, a network interface card ("NIC"), a hub, a bridge, a server, an optical add/drop multiplexer ("OADM"), a mobility management entity ("MME"), a serving gateway ("SGW"), a packet data network gateway ("PGW"), or another type of device included in area network 240 and/or network 260. In some implementations, network device 230 may be capable of gathering, measuring, receiving, storing, processing, or otherwise obtaining traffic information associated with network device 230, network 240, and/or network 260. In some implementations, network device 230 may provide the traffic information to local optimization device 230.

Local optimization device 230 may include a device, included in area network 240, associated with collecting traffic information and optimizing area network 240 such that traffic, travelling via network devices 220 included in area network 240 and/or network 260, is treated in accordance with a QoS treatment level assigned to the traffic. For example, local optimization device 230 may include a computing device, such as a server device. In some implementations, local optimization device 230 may include one or more devices capable of receiving, providing, generating, storing, and/or processing traffic information received and/or provided by one or more network devices 220 (e.g., via area network 240). Additionally, or alternatively, local optimization device 230 may be capable of determining sets of weight factors, associated with network devices 220, to be applied to traffic associated with a group of corresponding QoS treatment levels, such that target performance metrics, associated with the QoS treatment levels, are satisfied. In some implementations, local optimization device 230 may be included in area network 240.

Area network 240 may include one or more wired and/or wireless networks. For example, area network 240 may include a cellular network, a public land mobile network ("PLMN"), a second generation ("2G") network, a third generation ("3G") network, a fourth generation ("4G") network, a fifth generation ("5G") network, an LTE network, and/or another network. Additionally, or alternatively, area network 240 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks. In some implementations, area network 240 may be associated with a particular geographic area (e.g., a city, a state, etc.) and/or a particular local optimization device 230 (e.g., when local optimization device 230 is configured to optimize network devices 220 included in area network 240 such that traffic, travelling via area network 240, is treated in accordance with a QoS treatment level assigned to the traffic). In some implementations, one or more area networks 240 may be included in network 260. In some implementations, area network 240 may allow local optimization device 230 to communicate with central optimization device 250.

Central optimization device 250 may include a device, included in network 260, associated with collecting traffic information and optimizing network devices 220 included in network 260 such that traffic, travelling via network 260, is treated in accordance with a QoS treatment level assigned to the traffic. For example, central optimization device 250 may include a computing device, such as a server device. In some implementations, central optimization device 250 may include one or more devices capable of receiving, providing, generating, storing, and/or processing traffic information received and/or provided by one or more local optimization devices 230 and/network devices 220 (e.g., via area network 240). Additionally, or alternatively, central optimization device 250 may be associated with a set of local optimization devices 230. In some implementations, central optimization device 250 may be included in one or more area networks 240.

Network 260 may include one or more wired and/or wireless networks. For example, network 240 may include a cellular network, a PLMN, a 2G network, a 3G network, a 4G network, a 5G network, an LTE network, and/or another network. Additionally, or alternatively, area network 240 may include a LAN, a WAN, a MAN, a telephone network, an ad hoc network, an intranet, the Internet, a fiber optic-based network, and/or a combination of these or other types of networks. In some implementations, network 260 may be associated with a particular geographic area (e.g., a country, a state, a group of countries, a group of states, etc.) and may include a set of area networks 240. In some implementations, network 260 may allow local optimization device 230 to communicate with central optimization device 250.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
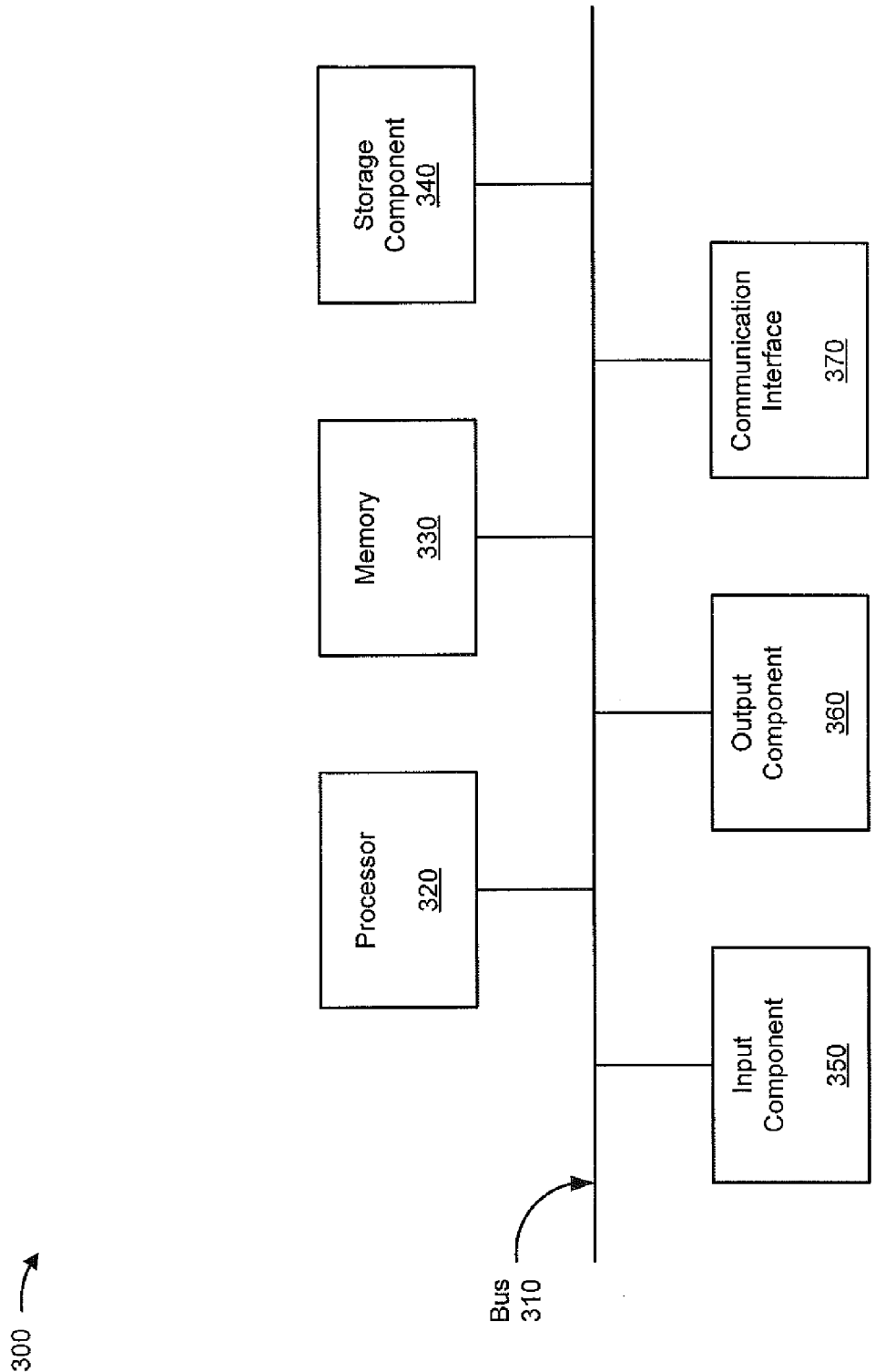
FIG. 3 is a diagram of example components of one or more devices of FIG. 2.

FIG. 3 is a diagram of example components of a device 300. Device 300 may correspond to endpoint devices 210, network devices 220, local optimization devices 230, and/or central optimization device 250. Additionally, or alternatively, each of endpoint devices 210, network devices 220, local optimization devices 230, and/or central optimization device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include any component that permits a user to input information to device 300 (e.g., a touch screen display, a keyboard, a keypad, a mouse, a button, a switch, etc.). Output component 360 may include any component that outputs information from device 300 (e.g., a display, a speaker, one or more light-emitting diodes ("LEDs"), etc.).

Communication interface 370 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 370 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 370. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

FIG. 4 is a flow chart of an example process 400 for updating a parameter, associated with a network device and based on a set of weight factors, to optimize a group of performance metrics for traffic travelling via the network device. In some implementations, one or more process blocks of FIG. 4 may be performed by local optimization device 230. In some implementations, one or more process blocks of FIG. 4 may be performed by another device or a group of devices separate from or including local optimization device 230, such as central optimization device 250.

As shown in FIG. 4, process 400 may include receiving traffic information associated with a group of QoS treatment levels and a network device (block 410). For example, local optimization device 230 may receive traffic information associated with a group of QoS treatment levels and network device 220. In some implementations, local optimization device 230 may receive the traffic information when network device 220 provides the traffic information (e.g., when network device 220 is configured to periodically provide the traffic information to local optimization device 230).

Traffic information may include information, associated with traffic assigned to a QoS treatment level, indicating a manner in which the traffic travels via network device 220. For example, the traffic information may include information associated with a traffic arrival rate, a traffic departure rate, arrival time stamp information associated with a packet included in the traffic, departure time stamp information associated with a packet included in the traffic, and/or other information associated with the manner in which the traffic travels via network device 220. In some implementations, local optimization device 230 may receive the traffic information from network device 220 on a periodic basis (e.g., every 100 milliseconds, every second, every 10 seconds, etc.). Additionally, or alternatively, local optimization device 230 may receive the traffic information based on input (e.g., from a user associated with local optimization device 230) indicating that local optimization device 230 is to receive the traffic information from network device 220. Additionally, or alternatively, local optimization device 230 may periodically request the traffic information (e.g., without user input).

In some implementations, the traffic information may be associated with network device 220. For example, the traffic information, received by local optimization device 230, may include information identifying a traffic arrival rate as being associated with network device 220, information identifying a traffic departure rate as being associated with network device 220, etc. Additionally, or alternatively, the traffic information may be associated with a QoS treatment level. For example, the traffic information, received by local optimization device 230, may include information indicating that a traffic arrival rate is associated with traffic assigned to a particular QoS treatment level, information indicating that a traffic departure rate is associated with traffic assigned to the particular QoS treatment level, etc.

In some implementations, the traffic information may be associated with both network device 220 and a particular QoS treatment. For example, local optimization device 230 may receive traffic information, associated with network device 220 included in area network 240, and the traffic information associated with network device 220 may include traffic information associated with traffic assigned to each QoS treatment level of the group of QoS treatment levels.

In some implementations, local optimization device 230 may receive traffic information associated with multiple network devices 220 (e.g., when local optimization device 230 is configured to optimize area network 240 from end-to-end, when local optimization device 230 is configured to optimize a portion of area network 240 that includes multiple network devices 220, etc.). For example, local optimization device 230 may be configured to determine multiple sets of weight factors that correspond to multiple network devices 220, and local optimization device 230 may receive traffic information associated with multiple network devices 220.

Additionally, or alternatively, the traffic information may also include configuration information, associated with area network 240 and/or network 260, that indicates a network topology associated with network devices 220 included in area network 240 and/or network 260. Additionally, or alternatively, the traffic information may include information identifying a set of weight factors previously determined by local optimization device 230 and applied to the group QoS treatment levels by network device 220. The set of weight factors is further described below with regard to block 450.

As further shown in FIG. 4, process 400 may include determining, based on the traffic information, a group of performance metrics that correspond to the group of QoS treatment levels (block 420). For example, local optimization device 230 may determine, based on the traffic information, a group of performance metrics that correspond to the group of QoS treatment levels. In some implementations, local optimization device 230 may determine the group of performance metrics when local optimization device 230 receives the traffic information from network device 220 (e.g., after local optimization device 230 receives the traffic information from network device 220).

A performance metric may include a measurement, associated with traffic travelling via network device 220, that may be used to determine whether the traffic is being processed in accordance with a QoS treatment level assigned to the traffic. For example, the performance metric may include information indicating an amount of latency, an error rate, an amount of bandwidth, an amount of throughput, an amount of jitter, a packet error rate, a packet drop rate, etc. associated with traffic travelling via network device 220. In some implementations, a QoS treatment level may used to identify a target performance metric associated with traffic assigned to the QoS treatment level, as discussed below with regard to block 440.

In some implementations, local optimization device 230 may determine the performance metric based on the traffic information received by local optimization device 230. For example, local optimization device 230 may receive traffic information that includes a traffic arrival rate for traffic (e.g., assigned to a particular QoS treatment level, such as QCI1) arriving at network device 220 and a traffic departure rate for the traffic departing from network device 220. In this example, local optimization device 230 may determine a performance metric that identifies a queue backlog associated with the particular QoS treatment level at network device 220 (e.g., based on the difference between the traffic arrival rate and the traffic departure rate). Continuing with this example, local optimization device 230 may determine a performance metric that identifies an amount of latency based on the traffic arrival rate and the queue backlog.

As another example, local optimization device 230 may receive traffic information that includes arrival time stamp information associated with a group of packets included in the traffic (e.g., assigned to a QoS treatment level) arriving at network device 220, and departure time stamp information associated with the group of packets when the packets depart from network device 220. In this example, local optimization device 230 may determine a performance metric that identifies an amount of latency for traffic assigned to the QoS treatment level and travelling via network device 220 (e.g., based on an average difference between the arrival time stamp information and the departure time stamp information of the group of packets). While implementations described herein are described largely in the context of latency, these implementations may be equally applied to another type of performance metric, such as an error rate, an amount of bandwidth, an amount of throughput, an amount of jitter, a packet error rate, a packet drop rate, or the like.

As further shown in FIG. 4, process 400 may include updating a prediction model, associated with the network device, based on the group of performance metrics (block 430). For example, local optimization device 230 may update a prediction model, associated with network device 220, based on the group of performance metrics. In some implementations, local optimization device 230 may update the prediction model when local optimization device 230 determines the group of performance metrics (e.g., after local optimization device 230 determines the group of performance metrics). Additionally, or alternatively, local optimization device 230 may update the prediction model when local optimization device 230 receives (e.g., from the user associated with local optimization device 230) information indicating that local optimization device 230 is to update the prediction model.

A prediction model may include a model, associated with network device 220, that predicts a performance metric for traffic assigned to a QoS treatment level travelling via network device 220. For example, the prediction model may be used to predict an amount of latency via network device 220 for a QoS treatment level (e.g., based on a weight factor associated with the QoS treatment level, as described below). In some implementations, the prediction model may be trained based on a set of historical traffic information where there are known inputs (e.g., a set of weight factors corresponding to a group of QoS treatment levels, a line rate, a group of traffic arrival rates corresponding to the group of QoS treatment levels, etc.) and known outputs (e.g., a group of performance metrics corresponding to the group of QoS treatment levels). For example, a set of historical traffic information may indicate that inputs A, B, C, D, E results in output Z. Once trained, the prediction model can predict outputs based on inputs. For example, if the prediction model received inputs A, B, C, E, then the prediction model might predict an output of Z (e.g., even though input D is not provided to the prediction model).

In some implementations, a prediction model may be associated with a particular network device (e.g., each network device 220 may be associated with a different prediction model). Alternatively, or additionally, a prediction model may be associated with a group of network devices 220 (e.g., when the prediction model is used to predict end-to-end latency via a group of network devices 220). Alternatively, or additionally, the prediction model may be associated with area network 240 and/or network 260 (e.g., when the prediction model is used to predict latency via an entire network). In some implementations, the prediction model may be stored by local optimization device 230.

In some implementations, local optimization device 230 may update the prediction model based on the group of performance metrics determined by local optimization device 230. For example, local optimization device 230 may compute a predicted performance metric (e.g., as described below with regard to block 450), and local optimization device 230 may update the prediction model based on the difference between the performance metric, determined based on the traffic information, and the predicted performance metric computed using the prediction model (e.g., in a previous iteration of optimizing network device 220). In this way, the prediction model may be updated such that the prediction model becomes more accurate over time (e.g., as local optimization device 230 receives additional traffic information and compares the additional traffic information to previously predicted performance metrics).

As further shown in FIG. 4, process 400 may include determining a group of target performance metrics and a group of penalty factors associated with the group of QoS treatment levels (block 440). For example, local optimization device 230 may determine a group of target performance metrics and a group of penalty factors associated with the group of QoS treatment levels. In some implementations, local optimization device 230 may determine the group of target performance metrics and the group of penalty factors when local optimization device 230 determines the group of performance metrics that correspond to the QoS treatment levels (e.g., after local optimization device 230 determines the group of performance metrics associated with network device 220). Additionally, or alternatively, local optimization device 230 may determine the group of target performance metrics and the group of penalty factors when local optimization device 230 updates the prediction model.

A target performance metric may include a performance metric that indicates an allowable limit (e.g., a minimum, a maximum), associated with the performance metric, for traffic assigned to a QoS treatment level. For example, the target performance metric may include a maximum allowable amount of latency, a maximum allowable error rate, a minimum allowable amount of bandwidth, a minimum allowable amount of throughput, a maximum allowable amount of jitter, a maximum allowable packet error rate, a maximum allow packet drop rate, etc. for traffic assigned to the QoS treatment level.

In some implementations, the group of target performance metrics may include a target performance metric associated with each QoS treatment level. For example, the group of target performance metrics may include a first maximum allowable amount of latency for traffic assigned to a first QoS treatment level, a second maximum allowable amount of latency for traffic assigned to a second QoS treatment level, etc. Additionally, or alternatively, the group of target performance metrics may include information associated with multiple performance metrics. For example, the group of performance metrics may include a maximum allowable amount of latency for each QoS treatment level, and a maximum amount of jitter for each QoS treatment level.

In some implementations, the group of target performance metrics may be identified based on a specification associated with the QoS treatment level (e.g., a 3rd Generation Partnership Project (3GPP) specification, a network service provider specification, a QCI specification, a specification associated with area network 240 and/or network 260, etc.). In some implementations, local optimization device 230 may determine the group of target performance metrics based on information stored by local optimization device 230 (e.g., when local optimization device 230 stores a 3GPP specification, etc.). Additionally, or alternatively, local optimization device 230 may determine the group of performance metrics based on traffic information received by local optimization device 230 (e.g., when network devices 220 are configured to provide a network service provider specification along with the traffic information, etc.).

A group of penalty factors may include a group of values (e.g., numerical values) associated with indicating relative importance of the group of target performance metrics associated with the group of QoS treatment levels. For example, assume that the group of QoS treatment levels includes a first treatment level and a second treatment level. In this example, if a first penalty factor, associated with the first treatment level, is a value of 2, and a second penalty factor, associated with the second treatment level, is a value of 1, then the first penalty factor may indicate that satisfying a target performance metric for traffic assigned to the first treatment level is twice as important as meeting a target performance metric for traffic assigned to the second treatment level. In some implementations, the group of penalty factors may be a group of numerical values (e.g., integers, real numbers, etc.) and may be used to determine a set of weight factors, as described below with regard to block 450. In some implementations, each penalty factor in the group of penalty factors may correspond to a different QoS treatment level.

In some implementations, local optimization device 230 may determine the group of penalty factors based on information stored by local optimization device 230. Additionally, or alternatively, local optimization device 230 may determine the group of penalty factors based on information provided by a user of local optimization device 230 (e.g., when the user provides input identifying the group of penalty factors). Additionally, or alternatively, local optimization device 230 may determine the group of penalty factors based on information provided by network device 220.

As further shown in FIG. 4, process 400 may include determining a set of weight factors, associated with the group of QoS treatment levels, to be applied by the network device (block 450). For example, local optimization device 230 may determine a set of weights factors, associated with the group of QoS treatment levels, to be applied by network device 220. In some implementations, local optimization device 230 may determine the set of weight factors after local optimization device 230 determines the group of target performance metrics and the group of penalty factors. Additionally, or alternatively, local optimization device 230 may determine the set of weight factors when local optimization device 230 receives information (e.g., user input) indicating that local optimization device 230 is to determine the set of weight factors.

A set of weight factors may include a set of values (e.g., numerical values) associated with determining an amount of resources (e.g., a fixed line rate) that is to be dedicated to traffic, assigned to each QoS treatment level, travelling via network device 220. For example, assume that the group of QoS treatment levels includes a first treatment level, a second treatment level, and a third treatment level, and that a first weight factor, associated with the first treatment level, is a value of 0.6, a second weight factor, associated with the second treatment level, is a value of 0.3, and a third weight factor, associated with the third treatment level, is a value of 0.1. Further, assume that the line rate available to network device 220 is fixed at 10 gigabits per second (Gbps). In this example, the first weight factor indicates that 60% of the fixed line rate, or 6 Gbps (e.g., $0.6/(0.6+0.3+0.1) \times 100\%$), is to be dedicated to traffic assigned to the first treatment level. Similarly, the second weight factor indicates that 30% of the fixed line rate, or 3 Gbps (e.g., $0.3/(0.6+0.3+0.1) \times 100\%$), is to be dedicated to traffic assigned to the second treatment level. Finally, the third weight factor indicates that 10% of the fixed line rate, or 1 Gbps (e.g., $0.1/(0.6+0.3+0.1) \times 100\%$), is to be dedicated to traffic assigned to the third treatment level. In some implementations, as shown in the example above, the sum total of each weight factor in the set of weight factors may equal a particular value (e.g., 1, 100, etc.), where the particular value corresponds to the total amount of available resources. In some implementations, the set of weight factors may include a set of numerical values (e.g., integers, real numbers, etc.). In some implementations, each weight factor in the set of weight factors may correspond to a different QoS treatment level.

In some implementations, local optimization device 230 may determine the set of weight factors based on the traffic information, the prediction model, the group of target performance metrics, and the group of penalty factors associated with the group of QoS treatment levels and network device 220. For example, local optimization device 230 may store information associated with a weight factor algorithm designed to determine the set of weight factors based on the traffic information, the prediction model, the group of target performance metrics, and the group of penalty factors.

In some implementations, local optimization device 230 may determine the set of weight factors such that the performance of network device 220 is optimized with respect to the group of target performance metrics. For example, the weight factor algorithm may be designed to determine a set of weight factors such that a sum of a group of distances, associated with the group of QoS treatment levels, is minimized. In this example, assume that the group of QoS treatment levels includes a first treatment level and a second treatment level. Here, the group of distances may include a first distance and a second distance, where the first distance corresponds to the difference between a first predicted performance metric and a first target performance metric associated with the first treatment level, and the second distance corresponds to the difference between a second predicted performance metric and a second target performance metric associated with the second treatment level. In this example, assume that the first predicted performance metric is determined using a first prediction model based on the traffic information, a first weight factor, a fixed line rate, and a first penalty factor that corresponds to the first treatment level, and that the second predicted performance metric is determined based on the traffic information, a second weight factor, the fixed line rate, and a second penalty factor that corresponds to the second treatment level. Continuing this example, the weight factor algorithm may be configured to determine a first weight factor and second weight factor (e.g., such that the sum of the first distance and the second distance is minimized) by modifying the first weight factor and the second weight factor (e.g., and generating additional predicted performance metrics).

In some implementations, local optimization device 230 may determine a different set of weight factors for different network devices 220. For example, local optimization device 230 may determine a first set of weight factors for a first network device 220, may determine a second set of weight factors for a second network device 220, etc. In this way, local optimization device 230 may determine an optimal set of weight factors for multiple network devices 220 such that the performance of area network 240 and/or network 260 is optimized.

As further shown in FIG. 4, process 400 may include outputting information associated with the set of weight factors to the network device to cause a parameter, associated with the network device, to be updated based on the set of weight factors (block 460). For example, local optimization device 230 may output information associated with the set of weight factors to the network device to cause a parameter, associated with network device 220, to be updated based on the set of weight factors. In some implementations, local optimization device 230 may output the information when local optimization device 230 determines the set of weight factors (e.g., local optimization device 230 may automatically cause the parameter to be updated after local optimization device 230 determines the set of weight factors). Additionally, or alternatively, local optimization device 230 may output the information when local optimization device 230 receives information indicating that local optimization device 230 is to cause the parameter to be updated (e.g., when a user of local optimization device 230 provides input indicating that local optimization device 230 is to cause the parameter to be updated).

In some implementations, local optimization device 230 may cause the parameter to be updated by providing the set of weight factors to network device 220. For example, local optimization device 230 may determine the set of weight factors, and may provide the set of weight factors to network device 220. In this example, network device 220 may receive the set of weight factors, and may update a parameter, associated with the set of weight factors, such that traffic, associated with each QoS treatment level, is travels via network device 220 in accordance with the set of weight factors. Here, the parameter may be associated with a manner in which the traffic is processed by network device 220, queued by network device 220, scheduled by network device 220, etc.

In some implementations, local optimization device 230 may cause the parameter to be automatically (e.g., without user intervention) updated (e.g., when network device 220 is configured to automatically update the parameter after network device 220 receives the set of weight factors). Additionally, or alternatively, local optimization device 230 may cause the parameter to be updated when a user, associated with network device 220, indicates (e.g., via user input) that network device 220 is to update the parameter (e.g., after network device 220 receives the set of weight factors).

In some implementations, local optimization device 230 may provide multiple sets of weight factors to multiple network devices 220. For example, if local optimization device 230 is configured to optimize a portion of a network that includes multiple network devices 220, then local optimization device 230 may determine multiple sets of weight factors and may provide the multiple sets of weight factors to the corresponding network devices 220.

As further shown in FIG. 4, process 400 may include providing, for display, a user interface that includes the traffic information and the group of performance metrics associated with the group of QoS treatment levels (block 470). For example, local optimization device 230 may provide, for display, a user interface that includes the traffic information and the group of performance metrics associated with the group of QoS treatment levels. In some implementations, local optimization device 230 may provide the user interface after local optimization device 230 causes the parameter, associated with the network device, to be updated based on the set of weight factors. Additionally, or alternatively, local optimization device 230 may provide the user interface when local optimization device 230 receives information (e.g., user input), indicating that local optimization device 230 is to provide the user interface.

In some implementations, local optimization device 230 may provide the user interface such that the user interface may be displayed via a display screen associated with local optimization device 230. Additionally, or alternatively, local optimization device 230 may provide the user interface for display on another device. In some implementations, local optimization device 230 may be periodically (e.g., every 1 second, every 5 seconds, etc.) update the user interface (e.g., as local optimization device 230 repeats process 400).

In some implementations, the user interface may include the traffic information. For example, the user interface may include a plot that depicts a traffic arrival rate of traffic, assigned to each QoS treatment level and received by network device 220, with respect to time.

Additionally, or alternatively, the user interface may include information associated with the group of performance metrics. For example, the user interface may include a plot that depicts an amount of latency, associated with each QoS treatment level and network device 220, with respect to time. In this example, the plot may also include information associated with the group of target performance metrics (e.g., such that the user may view an amount of latency for a QoS treatment level, measured in real-time, as compared to a target amount of latency for the QoS treatment level) and/or may include information associated with a default amount of latency (e.g., an amount of latency that may exist based on current weight factors applied by network device 220).

As another example, the user interface may include a plot that depicts an amount of latency, associated with each QoS treatment level and network device 220, with respect to a weight factor. In this example, the plot may include a curve associated with the prediction model (e.g., when the prediction model predicts latency as a function of weight factors), and the plot may be updated as local optimization device 230 updates the prediction model, as discussed above with regard to block 430.

Additionally or alternatively, the user interface may include information associated with the group of penalty factors. For example, the user interface may include information that identifies the group of penalty factors associated with the group of QoS treatment levels. In this example, the user interface may also include an input element (e.g., a button, a slider, etc.) that may allow the user to adjust the group of penalty factors (e.g., when the user wishes to increase or decrease a penalty factor associated with a QoS treatment level).

In some implementations, the user interface may include information associated with multiple network devices 220. For example, the user interface may include multiple groups of plots (e.g., as described above) where each group of plots corresponds to a different network device 220. Additionally, or alternatively, the user interface may include information associated with area network 240 and/or network 260. For example, the user interface may include a group of plots (e.g., as described above), where each plot corresponds to overall traffic information or a group of overall performance metrics associated with area network 240. In some implementations, the user interface may include an element (e.g., a menu, a dropdown box, a selection tree, etc.) that may allow a user to select a particular portion of area network 240 and/or network 260. For example, the user interface may include a selection tree that allows the user to select network 260, area network 240, a group of network devices 220, and/or a particular network device 220 such that the user may view information (e.g., one or more groups of plots) associated with the user selection. In this way, the user may view traffic information and/or information associated with a group of performance metrics from a high (e.g., network 260) level or a low (e.g., network device 220) level.

In some implementations, local optimization device 230 may return to block 410 and repeat process 400 (e.g., such that local optimization device 230 continuously adjusts sets of weight factors and updates the user interface). In this way, network devices 220, included in area network 240 and/or network 260, may be configured such that traffic travelling via area network 240 and/or network 260 is processed in an optimized manner based on target performance metrics associated with QoS treatment levels assigned to the traffic. Additionally, a user, associated with area network 240 and/or network 260, may be provided with a user interface, associated with the performance of network devices 220 with respect to target performance metrics, such that the user may view, control, manage, configure, etc. the optimization of network devices 220.

In some implementations, the user interface may also include one or more input elements that allow the user to provide test information that may be used, by local optimization device 230, to determine a group of test performance metrics for traffic associated with the group of QoS treatment levels (e.g., such that performance of network device 220 may be tested based on user provided test information rather than actual traffic information). For example, the test information may include a test traffic arrival rate of traffic associated with one or more QoS treatment levels. As an additional example, the test information may include a group of test penalty factors associated with one or more QoS treatment levels.

In some implementations, local optimization device 230 may receive the test information after local optimization device 230 provides the user interface. Additionally, or alternatively, local optimization device 230 may receive the test information when a user, associated with local optimization device 230, provides input associated with the test information.

In some implementations, local optimization device 230 may receive the test information via the user interface described above. For example, a user of local optimization device 230 may indicate (e.g., by selecting a menu item, by selecting a button, etc.) that local optimization device 230 is to go into an "offline" mode (e.g., such that local optimization device 230 discontinues optimizing the performance of network devices 220 based on actual traffic information), and the user may provide, via an input element included in the user interface (e.g., a slider, a dropdown menu, a radio button, etc.) input that identifies the test information.

In some implementations, local optimization device 230 may determine a set of test weight factors based on the test information, and may update the user interface based on the set of test weight factors and a group of test performance metrics determine based on the set of test weight factors. In other words, local optimization device 230 may use the test information as if the test information were actual traffic information, and may update the user interface in the manner described above. In this way, the user may test the performance of one or more network devices 220, area network 240, and/or network 260 without actually modifying parameters associated with one or more network devices 220.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

FIGS. 5A-5E are diagrams of an example implementation 500 relating to example process 400 shown in FIG. 4. For the purposes of example implementation 500, assume that an area network (e.g., Region 2), associated with a particular geographic area, includes a first network segment (e.g., S1) that includes an Ethernet backhaul device (e.g., EBH1), a second network segment (e.g., S2) that includes a media gateway (e.g., MGX), and a third network segment (e.g., S3) that includes a packet data network gateway (e.g., PGW3). Further, assume that a local optimization device, LOD2, is configured to optimize EBH1, MGX, and PGW3 such that traffic, travelling via the network devices included in Region 2, is treated in accordance with QoS treatment levels (e.g., QCI1 through QCI9) assigned to the traffic. While example implementation 500 discusses EBH1, MGX, and PGW3 as examples of devices included in Region 2, Region 2 may include additional and/or different devices, such as eNodeBs, MMEs, SGWs, additional EBHs, additional media gateways, additional PGWs, etc.

Figure 5A:
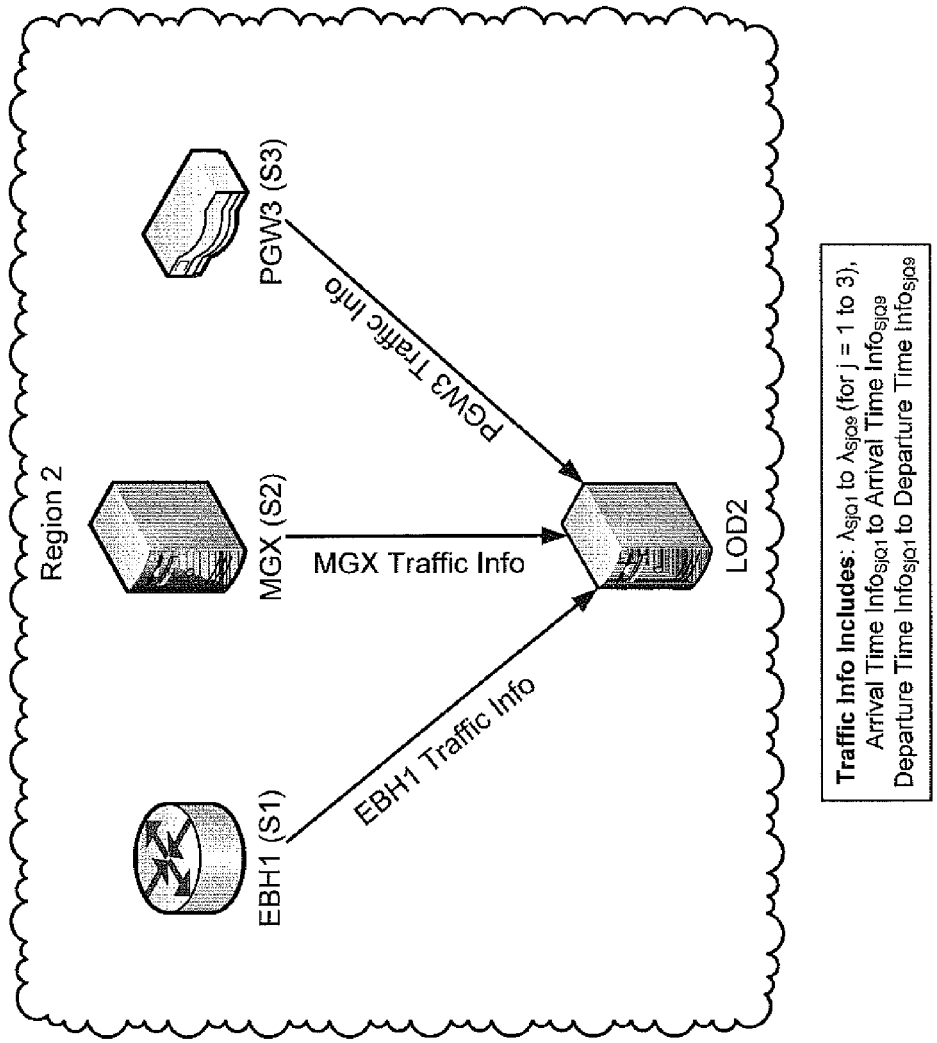
FIGS. 5A-5E are diagrams of an example implementation relating to the example process shown in FIG. 4.

As shown in FIG. 5A, EBH1, MGX, and PGW3 may collect traffic information associated with traffic travelling via EBH1, MGX, and PGW3, respectively. As shown, assume that the traffic information (e.g., associated with each network device) includes a traffic arrival rate associated with each QoS treatment level (e.g., $\lambda_{SjQ1}$ to $\lambda_{SjQ9}$), packet arrival time stamp information associated with each QoS treatment level (e.g., Arrival Time Info$_{SjQ1}$ to Arrival Time Info$_{SjQ9}$), and packet departure time stamp information associated with each QoS treatment level (e.g., Departure Time Info$_{SjQ1}$ to Departure Time Info$_{SjQ9}$). As shown, EBH1, MGX, and PGW3 may each provide their respective traffic information to LOD2.

Figure 5B:
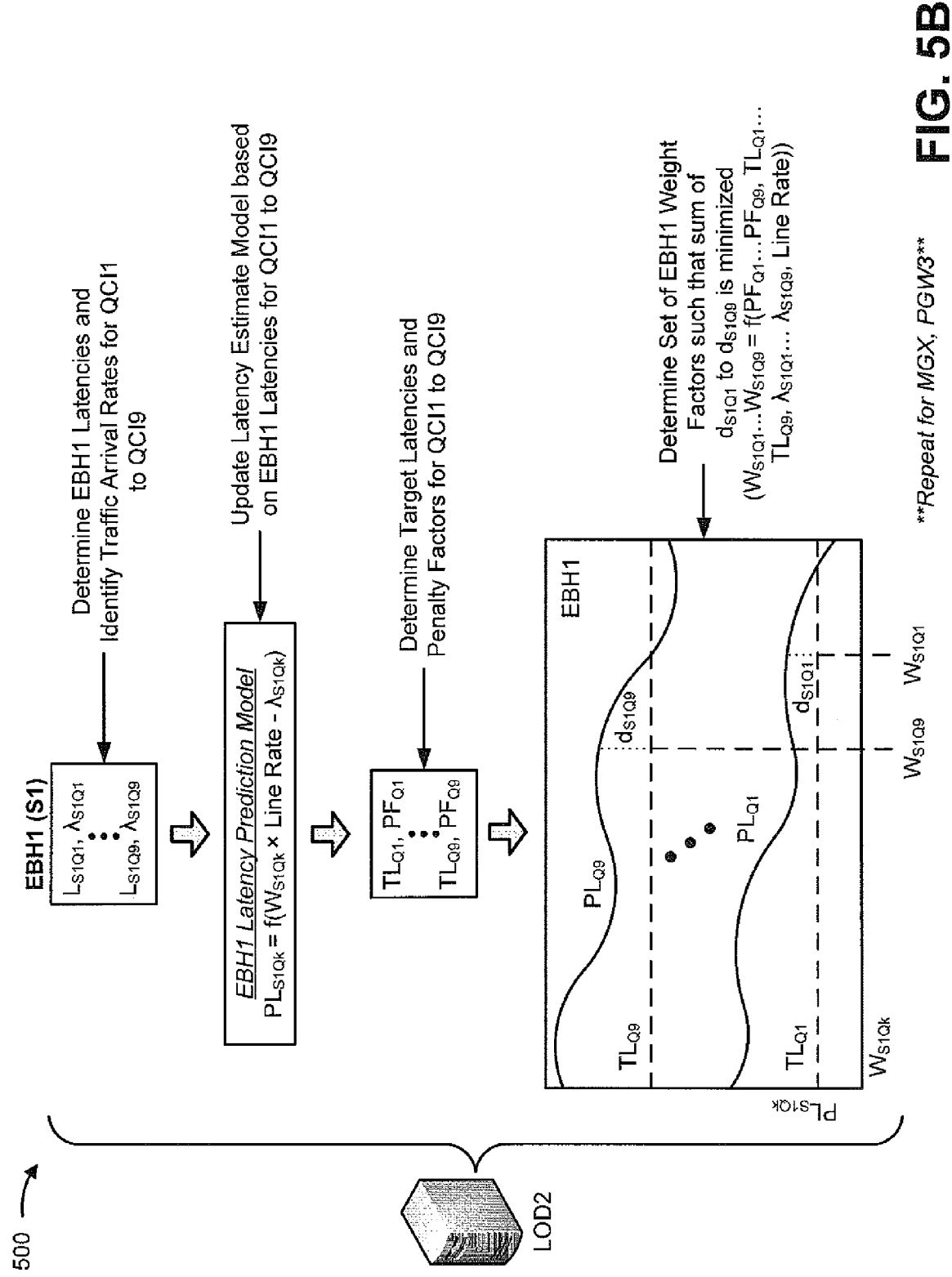

As shown in FIG. 5B, assume that LOD2 is configured to determine a set of weight factors for EBH1 (e.g., also MGX and PGW3—though not shown). As shown, LOD2 may determine a group of latencies (e.g., $L_{S1Q1}$ to $L_{S1Q9}$) based on the packet arrival time stamp information and the packet departure time stamp information associated with each QoS treatment level. As further shown, LOD2 may identify the traffic arrival rates (e.g., $\lambda_{S1Q1}$ to $\lambda_{S1Q9}$) associated with each QoS treatment level (e.g., such that the traffic arrival rates may be used to determine a set of weight factors for EBH1).

As further shown, assume that LOD2 stores an EBH1 latency prediction model associated with predicting an amount of latency for traffic travelling via EBH1. As shown, the EBH1 latency prediction model may be configured to compute a predicted latency for a QoS treatment level (e.g., $PL_{S1Qk}$) based on a weight factor associated with the QoS treatment level (e.g., $W_{S1Qk}$), a fixed line rate (e.g., stored by LOD2), and a traffic arrival rate (e.g., $\lambda_{S1Qk}$). As shown, LOD2 may update the EBH1 latency prediction model based on the latencies determined by LOD2. For example, LOD2 may have previously optimized EBH1 by predicting an amount of latency for each QoS treatment level, and LOD2 may update the EBH1 prediction model based on the previous prediction, a previous set of weight factors, and the latencies determined by EBH1 based on the traffic information.

As further shown in FIG. 5B, LOD2 may determine a group of target latencies (e.g., $TL_{Q1}$ to $TL_{Q9}$) and a group of penalty factors (e.g., $PF_{Q1}$ to $PF_{Q9}$) for each QoS treatment level. For the purposes of example implementation 500, assume that LOD2 stores information that identifies the group of target latencies and the group of penalty factors. As shown, LOD2 may determine (e.g., using a weight factor algorithm stored by LOD2) a set of EBH1 weight factors (e.g., $W_{S1Q1}$ to $W_{S1Q9}$) such that a sum of a group of distances (e.g., $d_{S1Q1}$ to $d_{S1Q9}$), associated with the group of QoS treatment levels, is minimized. As shown, each distance may correspond to the difference between a group of predicted latencies (e.g., $PL_{Q1}$ to $PL_{Q9}$), determined using the updated latency prediction model, and the group of target latencies. As shown, the weight factor algorithm may determine the set of weight factors based on the group of penalty factors, the group of target latencies, the traffic arrival rate associated with each QoS treatment level, and the line rate. As shown, LOD2 may determine sets of weight factors for MGX and PGW3 in a similar manner.

Figure 5C:
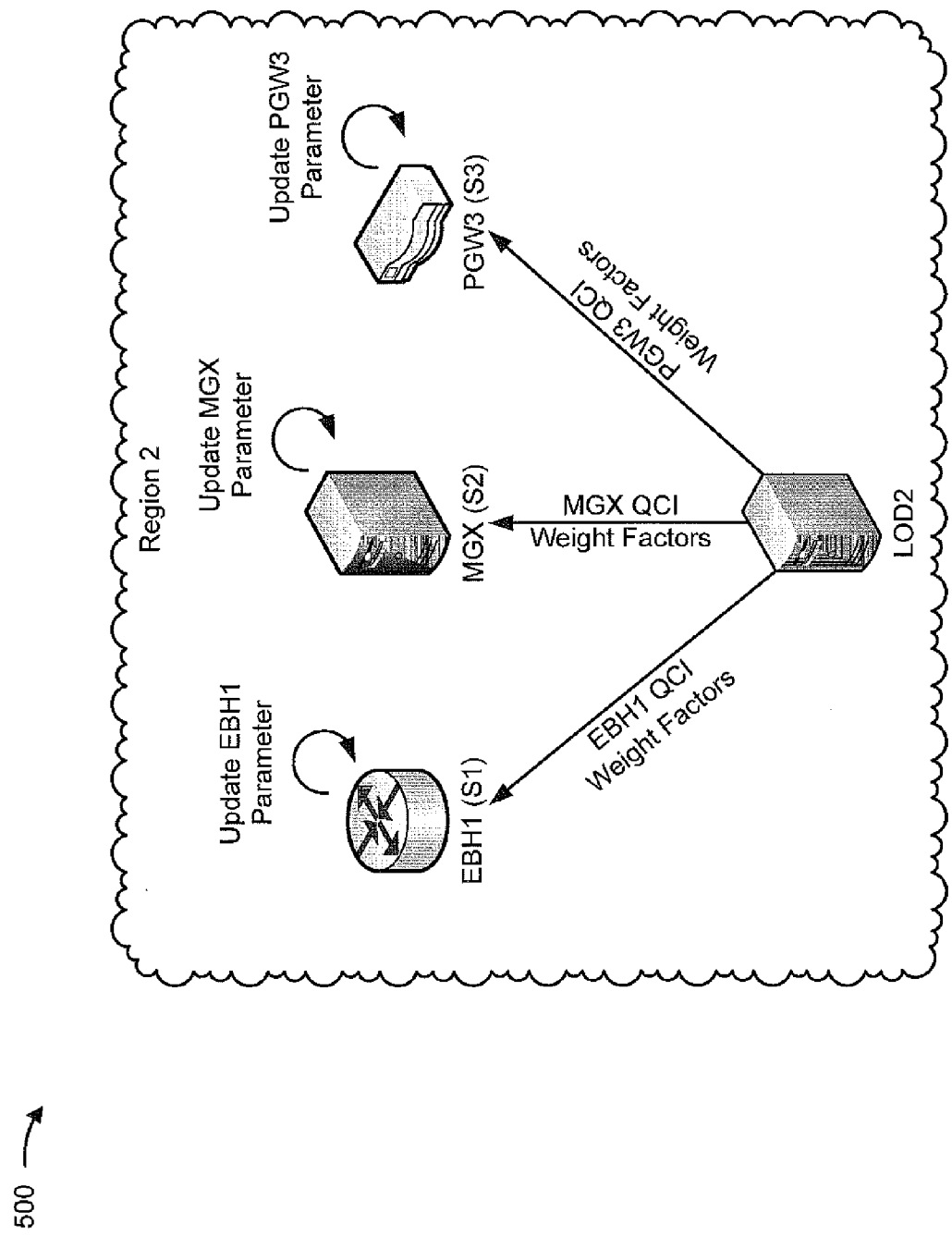

As shown in FIG. 5C, assume that LOD2 has determined sets of weight factors that correspond to EBH1, MGX, and PGW3 (e.g., in the manner described above). As shown, LOD2 may provide the sets of weight factors to the corresponding network devices. As further shown, EBH1, MGX, and PGW3 may each update a parameter, associated with processing traffic assigned to each QoS treatment level, based on receiving the weight factors provided by LOD2.

Figure 5D:
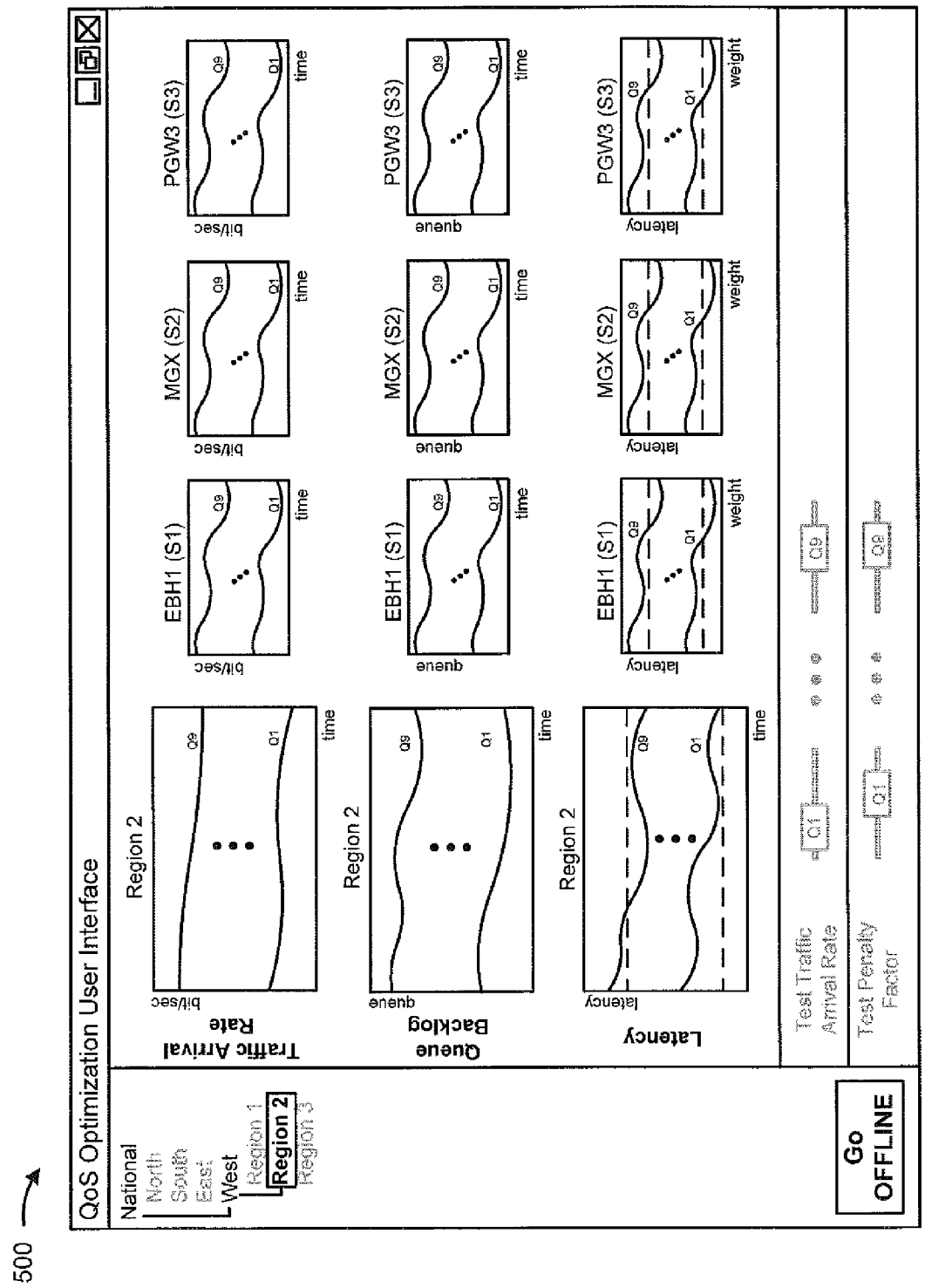

As shown in FIG. 5D, LOD2 may display (e.g., via a display screen associated with LOD2), a user interface that includes the traffic information and the group of performance metrics, associated with the group of QoS treatment levels, for EBH1, MGX, and PGW3. As shown, the user interface may include a plot depicting the traffic arrival rate, for each QoS treatment level and with respect to time, and a plot depicting a queue backlog, for each QoS treatment level and with respect to time, associated with EBH1, MGX and PGW3. As further shown, the user interface may include a plot depicting the amount of latency, for each QoS treatment level and with respect to weight, associated with EBH1, MGX, and PGW3.

As shown, the user interface may include a group of plots that depict an overall traffic arrival rate for Region 2 with respect to time, an overall queue backlog for Region 2 with respect to time, and an overall amount of latency for Region 2 with respect to time. LOD2 may continue to optimize the network devices included in Region 2, and may continue to update the user interface, accordingly (e.g., such that LOD2 continuously updates the user interface). As further shown, the user interface may also include a selection tree that allows a user to view and/or manage network optimization in additional areas of a National network (e.g., North, South, East, West, Region 1, Region 3, etc.). As also shown, the user interface may include a button (e.g., "Go OFFLINE") associated with entering an "offline" mode that allows the user interface to provide test information associated with Region 2.

Figure 5E:
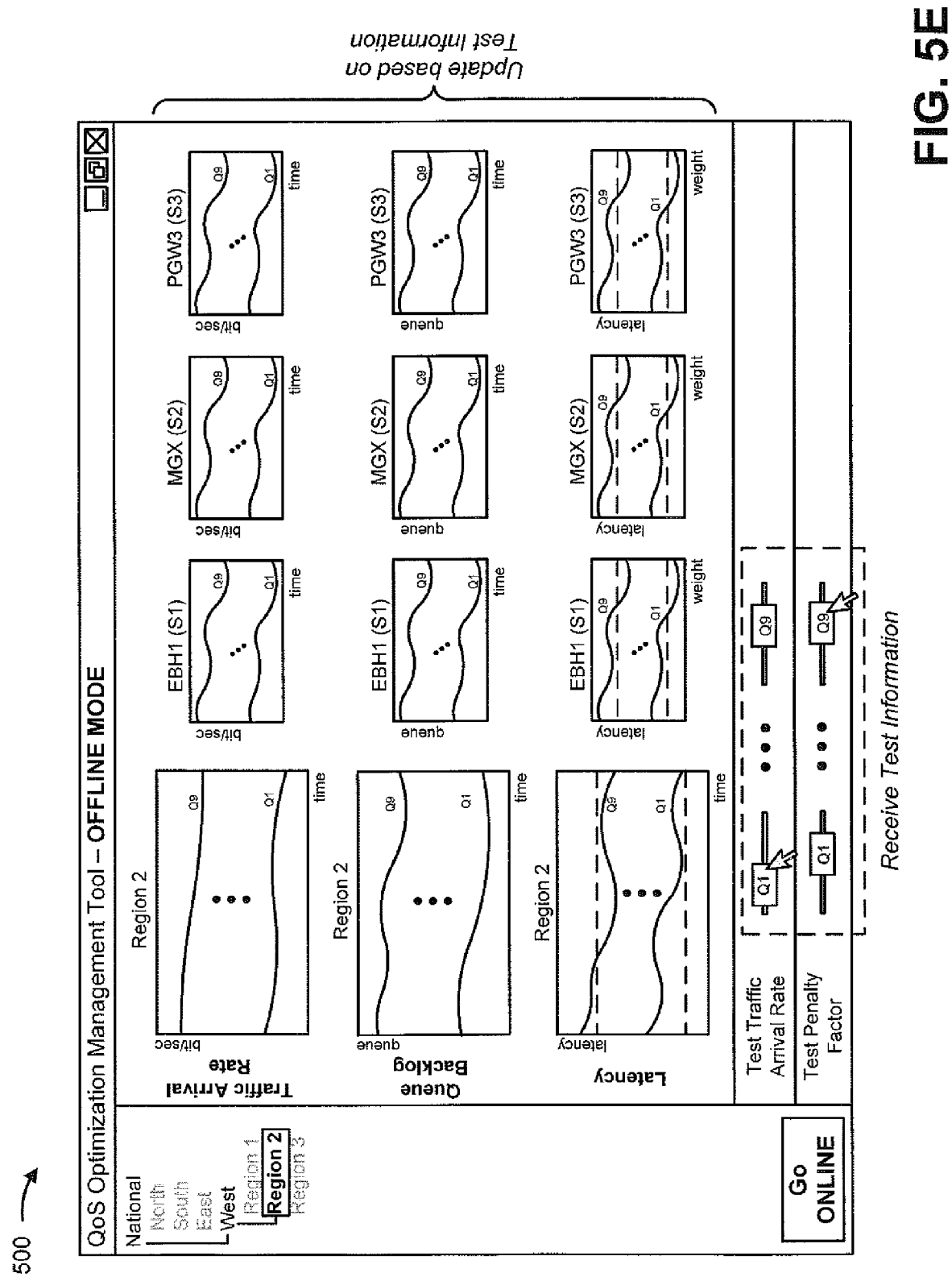

As shown in FIG. 5E, assume that the user has selected the "Go OFFLINE" button that causes LOD2 to discontinue optimizing the network devices included in Region 2 in real-time. As shown, the user may provide test information, associated with Region 2, that includes a test traffic arrival rate for each of the QoS treatment levels and a test penalty factor for each of the QoS treatment levels. For example, the user may provide, via a first set of sliders included in the user interface, input associated with test traffic arrival rates for each QoS treatment level. In this example, the user may indicate a test traffic arrival rate (e.g., in terms of percentage of available line rate) for traffic associated with a QoS treatment by moving a corresponding slider to the left (e.g., to decrease the percentage) or the right (e.g., to increase the percentage). As another example, the user may provide, via a second set of sliders included in the user interface, information associated with a test penalty factor for each QoS treatment level. In this example, the user may indicate a decreased or an increased test penalty factor for traffic associated with a QoS treatment by moving a corresponding slider to the left or the right, respectively.

LOD2 may receive the test information, may determine a set of test weight factors based on the test information, and may determine test performance metrics based on the test information. As shown, LOD2 may update the user interface (e.g., the plots included in the user interface) based on the test information and the test performance metrics). In this way, the user may test the performance of EBH1, MGX, and PGW3 (e.g., included in Region 2) based on a set of test conditions (e.g., test traffic arrival rates and test penalty factors) without actually modifying parameters associated with EBH1, MGS, or PGW3.

As indicated above, FIGS. 5A-5E are provided merely as an example. Other examples are possible and may differ from what was described with regard to FIGS. 5A-5E.

Implementations described herein may allow network devices included in a network to be configured such that traffic travelling via the network is processed in an optimized manner based on a target performance metric associated with a QoS treatment level assigned to the traffic. Implementations described herein may also allow a network service provider, associated with network, to be provided with a user interface associated with the performance of the network devices with respect to target performance metrics, such that the user may view, control, manage, configure, etc. the optimization of the network devices.

The foregoing disclosure provides illustration and description, but is not intended to be exhaustive or to limit the implementations to the precise form disclosed. Modifications and variations are possible in light of the above disclosure or may be acquired from practice of the implementations. For example, while the processes and/or methods described herein are described in the context of local optimization of an area network, these processes and/or methods may be equally applied to global optimization of a global network (e.g., a network that includes multiple area networks). When a parameter, associated with a network device included in an area network, is modified, there exists a probability that a performance of other network devices (e.g., included in another area network, included in the global network, etc.) will be impacted. Using the processes and/or methods described herein, optimization of the global network may be scaled by determining relationships between network devices. This may be achieved by determining configuration information (e.g., routing information, routing tables, etc.) associated with network devices (e.g., included in the global network) during global optimization. The relationships between the network devices and a direction of traffic flow, associated with the network devices, may be determined based on the configuration information, and may be used to perform global optimization of the global network.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more memories; and
one or more processors, connected to the one or more memories, to:

receive traffic information associated with traffic flows assigned to a group of quality of service (QoS) treatment levels,
the traffic flows being associated with traffic travelling via a network device;
identify a group of target performance metrics corresponding to the group of QoS treatment levels;
determine a group of weight factors based on the traffic information and the group of target performance metrics,
the group of weight factors being determined such that a group of predicted performance metrics is optimized with respect to the group of target performance metrics,
each predicted performance metric of the group of predicted performance metrics corresponding to a QoS treatment level of the group of QoS treatment level; and
output information identifying the group of weight factors to cause a parameter, associated with the network device, to be updated based on the group of weight factors,
the parameter relating to a manner in which traffic flows are processed by the network device.

2. The device of claim 1, where the one or more processors, when receiving the traffic information associated with the traffic flows assigned to the group of QoS treatment levels, are to:
determine a group of performance metrics that corresponds to the group of QoS treatment levels; and
update a prediction model, associated with determining the group of predicted performance metrics, based on the group of performance metrics.

3. The device of claim 1, where the one or more processors are further to:
determine a group of penalty factors that corresponds to the group of QoS treatment levels; and
where the one or more processors, when determining the group of weight factors, are to:
determine the group of weight factors based on the group of penalty factors that corresponds to the group of QoS treatment levels.

4. The device of claim 1, where the one or more processors are further to:
provide, for display, a user interface including graphical information associated with the network device,
the graphical information including:
the traffic information;
information associated with a group of performance metrics,
the group of performance metrics being indicated by the traffic information;
information associated with the group of target performance metrics;
information associated with the group of predicted performance metrics; or
information associated with the group of weight factors.

5. The device of claim 4, where the one or more processors are further to:
receive additional traffic information;
determine an additional group of weight factors based on the additional traffic information; and
update the user interface based on the additional group of weight factors and the additional traffic information.

6. The device of claim 4, where the one or more processors, when providing the user interface for display, are to:

receive test information via the user interface,
the test information including information associated with testing a performance of the network device;
determine a group of test weight factors, corresponding to the group of QoS treatment levels, based on the test information; and
update the user interface based on the test information and the group of test weight factors.

7. The device of claim 4, where the user interface includes:
graphical information associated with a plurality of network devices.

8. A method, comprising:
receiving, by a device, traffic information associated with traffic flows travelling via a network device,
each of the traffic flows corresponding to a quality of service (QoS) level in a set of QoS levels;
determining, by the device, a set of target performance metrics,
each target performance metric in the set of target performance metrics corresponding to a QoS level in the set of QoS levels;
computing, by the device, a set of weight factors based on the traffic information and the set of target performance metrics,
the set of weight factors being computed such that a set of predicted performance metrics is optimized based on the set of target performance metrics,
each predicted performance metric in the set of predicted performance metrics corresponding to a QoS level in the set of QoS levels; and
outputting, by the device, information identifying the set of weight factors to cause a weight factor parameter, associated with the network device, to be modified based on the set of weight factors,
the weight factor parameter relating to a manner in which the traffic flows are handled by the network device.

9. The method of claim 8, where receiving the traffic information associated with the traffic flows comprises:
determining a set of performance metrics that corresponds to the set of QoS levels; and
updating a performance metric prediction model, associated with determining the set of predicted performance metrics, based on the set of performance metrics.

10. The method of claim 8, further comprising:
determining a set of penalty factors that corresponds to the set of QoS levels; and
where computing the set of weight factors comprises:
computing the set of weight factors based on the set of penalty factors that corresponds to the set of QoS levels.

11. The method of claim 8, further comprising:
providing, for display, a user interface that includes graphical information associated with the network device,
the graphical information including:
the traffic information;
information associated with a set of performance metrics,
the set of performance metrics being indicated by the traffic information;
information associated with the set of target performance metrics;
information associated with the set of predicted performance metrics; or
information associated with the set of weight factors.

12. The method of claim 11, further comprising:
receiving additional traffic information;

computing an additional set of weight factors based on the additional traffic information; and updating the user interface based on the additional set of weight factors and the additional traffic information.

13. The method of claim 11, where providing the user interface for display comprises:
   receiving test information via the user interface,
      the test information including information associated with testing a performance of the network device;
   computing a set of test weight factors, corresponding to the set of QoS levels, based on the test information; and
   updating the user interface based on the test information and the set of test weight factors.

14. The method of claim 11, where the user interface includes:
   graphical information associated with a plurality of network devices.

15. A non-transitory computer-readable medium storing instructions, the instructions comprising:
   one or more instructions that, when executed by one or more processors, cause the one or more processors to:
      receive traffic information associated with a group of traffic flows corresponding to a group of quality of service (QoS) treatment levels,
         the group of traffic flows travelling via a network device;
      determine a group of target performance metrics corresponding to the group of QoS treatment levels;
      determine, based on the traffic information and the group of target performance metrics, a group of weight factors such that a group of predicted performance metrics is optimized with respect to the group of target performance metrics,
         each predicted performance metric, of the group of predicted performance metrics, corresponding to a QoS treatment level of the group of QoS treatment level, and
         each predicted performance metric, of the group of predicted performance metrics, being determined based on a prediction model associated with the network device;
      output information identifying the group of weight factors to cause a parameter, associated with the network device, to be updated based on the group of weight factors,
         the parameter relating to a manner in which the group of traffic flows is processed by the network device; and
      provide, for display, a user interface that includes a graphical representation associated with the network device,
         the graphical representation including information associated with the traffic information, information associated with a group of performance metrics associated with the traffic information, information associated with the group of target performance metrics, information associated with the group of predicted performance metrics, or information associated with the group of weight factors.

16. The non-transitory computer-readable medium of claim 15, where the one or more instructions, that cause the one or more processors to receive the traffic information, cause the one or more processors to:
   determine the group of performance metrics,
      the group of performance metrics corresponding to the group of QoS treatment levels; and
   update the prediction model based on the group of performance metrics.

17. The non-transitory computer-readable medium of claim 15, where the one or more instructions, when executed by the one or more processors, further cause the one or more processors to:
   determine a group of penalty factors that corresponds to the group of QoS treatment levels; and
   where the one or more instructions, that cause the one or more processors to determine the group of weight factors, cause the one or more processors to:
      determine the group of weight factors based on the group of penalty factors that corresponds to the group of QoS treatment levels.

18. The non-transitory computer-readable medium of claim 15, where the user interface includes:
   graphical information associated with a plurality of network devices.

19. The non-transitory computer-readable medium of claim 15, where the one or more instructions, when executed by the one or more processors, further cause the one or more processors to:
   receive other traffic information,
      the other traffic information being received after the traffic information;
   determine another group of weight factors based on the other traffic information; and
   update the user interface based on the other group of weight factors and the other traffic information.

20. The non-transitory computer-readable medium of claim 15, where the one or more instructions, that cause the one or more processors to provide the user interface for display, cause the one or more processors to:
   receive test information via the user interface,
      the test information including information associated with testing a performance of the network device;
   determine a group of test weight factors, corresponding to the group of QoS treatment levels, based on the test information; and
   update the user interface based on the test information and the group of test weight factors.

* * * * *